(12) United States Patent
Höss et al.

(10) Patent No.: US 12,091,975 B2
(45) Date of Patent: Sep. 17, 2024

(54) CONTROL FITTING, ARRANGEMENT AND METHOD FOR PRODUCING CONCRETE COMPONENTS

(71) Applicant: Putzmeister Engineering GmbH, Aichtal (DE)

(72) Inventors: Michael Höss, Bempflingen (DE); Andreas Kandler, Ostfildern (DE); Timo Lechler, Filderstadt (DE)

(73) Assignee: Putzmeister Engineering GmbH, Aichtal (DE)

( * ) Notice: Subject to any disclaimer, the term of this patent is extended or adjusted under 35 U.S.C. 154(b) by 0 days.

(21) Appl. No.: 17/769,208

(22) PCT Filed: Oct. 13, 2020

(86) PCT No.: PCT/EP2020/078687
§ 371 (c)(1),
(2) Date: Apr. 14, 2022

(87) PCT Pub. No.: WO2021/074101
PCT Pub. Date: Apr. 22, 2021

(65) Prior Publication Data
US 2024/0133295 A1 Apr. 25, 2024
US 2024/0229645 A9 Jul. 11, 2024

(30) Foreign Application Priority Data

Oct. 15, 2019 (DE) ...................... 10 2019 127 693.4

(51) Int. Cl.
*E04G 21/04* (2006.01)
*E21D 11/04* (2006.01)
(Continued)

(52) U.S. Cl.
CPC ........ *E21D 11/105* (2013.01); *F16K 11/0716* (2013.01); *E04G 21/04* (2013.01)

(58) Field of Classification Search
CPC ........ E04G 21/04; E21D 11/10; E21D 11/105
See application file for complete search history.

(56) References Cited

U.S. PATENT DOCUMENTS

| 4,892,441 A | * | 1/1990 | Riker | .................... E21D 11/105 249/11 |
| 5,141,363 A | * | 8/1992 | Stephens | ................. C04B 28/02 405/150.2 |

(Continued)

FOREIGN PATENT DOCUMENTS

| CN | 202483822 U | 10/2012 |
| DE | 3811585 A1 | 10/1989 |

(Continued)

OTHER PUBLICATIONS

PCT International Search Report and Written Opinion for International application No. PCT/EP2020/078687 filed Oct. 13, 2020, Date of Mailing: Jan. 25, 2021; 14 pgs.

(Continued)

*Primary Examiner* — Benjamin F Fiorello
(74) *Attorney, Agent, or Firm* — Alix, Yale & Ristas, LLP

(57) ABSTRACT

The invention relates to a control fitting having a two-way cross-fitting, which has an inlet connecting piece, an outlet connecting piece and a passage connecting piece, and having a control element which is arranged in a guide connecting piece of the control fitting so as to be movable between an open position and a closed position, wherein the outlet connecting piece, in the open position of the control element, communicates with the inlet connecting piece and, in the closed position of the control element, is blocked relative to the inlet connecting piece and the passage connecting piece communicates with the inlet connecting piece both in the open position and in the closed position of the control element, and wherein the guide connecting piece has, on an (Continued)

end remote from the outlet connecting piece, an opening for receiving the control element.

25 Claims, 9 Drawing Sheets

(51) Int. Cl.
*E21D 11/10* (2006.01)
*F16K 11/07* (2006.01)

(56) References Cited

U.S. PATENT DOCUMENTS

| | | | | |
|---|---|---|---|---|
| 9,945,229 | B2* | 4/2018 | Kern | ............... E21D 11/102 |
| 2001/0038774 | A1* | 11/2001 | Lammertink | ............. E21D 9/04 |
| | | | | 405/150.1 |
| 2018/0335025 | A1* | 11/2018 | Wilson | ................ E04G 21/04 |

FOREIGN PATENT DOCUMENTS

| | | |
|---|---|---|
| DE | 102005032916 A1 | 1/2007 |
| DE | 102011007689 A1 | 10/2012 |
| EP | 0336331 A1 | 10/1989 |
| EP | 2699742 A1 | 2/2014 |
| EP | 2699742 B1 | 7/2016 |
| EP | 3216979 A1 | 9/2017 |
| JP | S63304875 A | 12/1988 |
| WO | 2012143247 A1 | 10/2012 |

OTHER PUBLICATIONS

German Office Action for German Application No. 10 2019 127 693.4 filed Oct. 15, 2019; Dated: Aug. 3, 2020; 8 pgs.

* cited by examiner

CONTROL FITTING, ARRANGEMENT AND METHOD FOR PRODUCING CONCRETE COMPONENTS

BACKGROUND

The invention relates to a control fitting, to an arrangement and to a method for producing concrete components using liquid concrete, and to a method for cleaning a corresponding arrangement and a corresponding control fitting.

Arrangements for filling formwork with liquid concrete are known in precast construction, tunnel construction and civil engineering. Arrangements for producing concrete components using a control fitting, with the aid of a liquid concrete pump and a delivery line connected to the latter, make it possible to fill formwork without segregation phenomena, with uniform concrete quality even over large concreting heights. One problem with these arrangements is the cleaning of regions of the control fittings which are difficult to access.

Known methods are based on hose lines, which have to be connected and reconnected to various nozzles arranged on the formwork. The hoses are then filled via a swivel distributor or via a pipe with various shut-off valves. During concreting, various transfer processes and intermediate cleaning operations are performed on the hoses. When the hose is removed from a nozzle, the residual concrete must additionally be ejected from the nozzle in the direction of the formwork skin in an additional working step by means of a special ejection spindle.

SUMMARY OF THE INVENTION

It is therefore the object of the present invention to provide a possibility for easier cleaning of arrangements for producing concrete components using liquid concrete.

Accordingly, the invention relates to a control fitting having a two-way cross fitting, which has an inlet port, an outlet port and a through-port, and having a control member, which is arranged in a guide piece of the control fitting so as to be movable between an open position and a closed position, wherein, in the open position of the control member, the outlet port communicates with the inlet port and, in the closed position of the control member, is shut off from the inlet port, and the through-port communicates with the inlet port both in the open position and in the closed position of the control member.

According to the invention, the guide piece has, on an end remote from the outlet port, an opening for receiving the control member.

Furthermore, the invention relates to an arrangement for producing concrete components using liquid concrete, having formwork, which is bounded by at least one formwork or shuttering wall aligned substantially vertically, at least in some section or sections, and having a device, comprising a liquid concrete pump, for introducing liquid concrete into the formwork, wherein a delivery line, which is connected to the liquid concrete pump at the inlet end, is arranged on an outer side of the formwork wall, said delivery line having at least one vertical run/vertical strand, in which a plurality of control fittings having a two-way cross fitting, is arranged for the successive filling of a formwork cavity behind the formwork wall.

The invention also relates to a method for producing a concrete component, comprising the following steps: providing a corresponding arrangement for producing concrete components using liquid concrete with the control fittings in the open position, supplying the delivery line with liquid concrete, filling the formwork cavity behind the formwork wall via a control fitting which is first in the vertical run in the vertical delivery direction, in the open position, moving the control member of the first control fitting into the closed position as soon as the concrete in the formwork cavity has reached the level of the first control fitting, continuing the filling of the formwork cavity behind the formwork wall via a control fitting which is next in the vertical run in the vertical delivery direction, in the open position, successively repeating the filling and movement into the closed position of the control member for all the control fittings.

The invention also relates to a method for cleaning a corresponding arrangement for producing concrete components using liquid concrete after a completed concrete filling operation with the control fittings in the closed position, in which a sponge ball is shot through the vertical run at a vertical upper end of each vertical run, e.g. by means of a preloaded cleaning port provided at the vertical upper end of the at least one vertical run.

The invention furthermore relates to a method for cleaning a corresponding control fitting, comprising the following steps: changing the guidance device over from the operating position into the cleaning position by releasing and moving the yoke in such a way that the control member is retracted fully from the guide piece, fixing the yoke in the cleaning position, releasing the yoke from one of the guide rods, pivoting the yoke about the corresponding other guide rod in such a way that the control member is pivoted out of the movement axis (or sliding axis) predetermined by the guide piece, thereby making the guide piece accessible, cleaning the control member and the guide piece by means of a cleaning medium, which is, for example, under pressure.

The invention is based above all on the concept of providing an open system in which the control member can be transferred after each concreting operation into a cleaning position for manual or automated cleaning without the necessity of additional assembly steps. The control member can be guided out of the guide piece through the opening, and this furthermore facilitates the cleaning of the guide piece, which is thus more easily accessible. For a subsequent concreting operation, an optimum initial situation is created and, in addition, the wear of the control fitting is minimized. The arrangement for producing concrete components using liquid concrete is thus easier to clean and ensures a continuous delivery process.

The guide piece and the control member can be designed in such a way that the control member projects at least partially out of the guide piece, at least in the open position. In contrast to closed systems, the length of the guide piece need not be adapted to the length of the control member. The opening can be dimensioned in such a way that the control member can be moved partially or completely through the opening.

The control fitting can have an openable safety cover, which covers a section of the control member that projects out of the guide piece in the open position. The safety cover thus covers the control member, which is movable during concreting, thereby minimizing the risk of injury.

In one possible embodiment, the control member can be brought into a first cleaning position fully retracted from the guide piece. In the first cleaning position, the control member can be cleaned from all sides. The control member can be brought out of the first cleaning position into a second cleaning position, which is, for example, outside a movement axis predetermined by the guide piece. In the second cleaning position, in addition to the control member, the guide piece is also accessible via the opening and can be cleaned. Moreover, there is a simple possibility of exchange.

The control fitting can have a guidance device, which is arranged outside the guide piece, for guiding the control member outside the guide piece. By means of the guidance device, the control member can be moved reliably even outside the guide piece. The guidance device can be changed over between an operating position and a cleaning position, wherein the operating position allows movement of the control member between the open position and the closed position, and, in the cleaning position, movement of the control member into the open and/or closed position is prevented. During concreting, the guidance device is firmly fixed in an operating position. The guidance device is then brought into the cleaning position for cleaning the control fitting and fixed there.

In the cleaning position, the guidance device can allow the control member to be pivoted out of a movement axis predetermined by the guide piece. This improves the accessibility of the guide piece and enables a better cleaning result.

The guidance device can comprise two guide rods, which are arranged both parallel to one another and parallel to a movement axis predetermined by the guide piece and on which a yoke for holding means for producing the translational movement of the control member is provided in a movable manner. The yoke can be movable on the guide rods between the operating position and the cleaning position, and/or the yoke can be designed to be detachable from a first of the guide rods in order to carry out a pivoting movement about a second of the guide rods.

The two-way cross fitting can be designed to be detachable from the guide piece or can be designed as a single piece (or integral) with the guide piece.

In one possible embodiment, the control member is designed as a piston with an aperture that is aligned with the through-port in the closed position. The piston can be made at least partially of polyurethane or can have a lateral surface formed substantially from polyurethane. This has the advantage that the piston can be removed more easily from the guide piece after the hardening process of the liquid concrete.

The control fitting has a cooling element, e.g. in a region of the guide piece. By means of the cooling element, it is possible to influence the temperature of the cement slurry which settles between the control member and the guide piece.

The arrangement for producing concrete components using liquid concrete can comprise at least one further vertical run, which is connected to the delivery line by means of a pipe switch. Vertical runs have the advantage over horizontal runs that, overall, less delivery line length is required and less residual concrete has to be removed when cleaning. Since the delivery line has fewer bends, the risk of clogging is reduced. In the case of vertical runs, it is also possible to make use of individual vertical runs only selectively, in order, for example, to concrete short blocks. In this case, unused vertical runs remain free of concrete. In the case of two or more vertical runs, the method for producing a concrete component can provide a pipe switch or tubular diverter, which supplies the vertical runs alternately with liquid concrete.

As one possible embodiment, a cleaning port provided at a vertical upper end of the at least one vertical run is used in the arrangement in order to shoot a sponge ball into the vertical run. The result of cleaning is improved since the risk of the sponge ball being stuck in the delivery line is reduced by virtue of the comparatively smaller number of bends and a reduced length of the delivery line. In the method for cleaning the arrangement, a sponge ball can be shot through the vertical run after a completed concrete filling operation—with the control fittings in the closed position. In particular, this is carried out with compressed air or water.

The control member, which projects partially out of the guide piece in the open position, can be cleaned by means of a cleaning medium, which is, for example, under pressure, in order to clean the control fitting. The control member can first be brought into a first cleaning position fully retracted from the guide piece and can then be cleaned. Before cleaning, the control member can be brought out of the first cleaning position into a second cleaning position, which is outside a movement axis predetermined by the guide piece.

BRIEF DESCRIPTION OF THE DRAWINGS

The invention is illustrated schematically in the drawing by means of an exemplary embodiment and is described below in detail with reference to the drawing.

DETAILED DESCRIPTION

Figure 1:
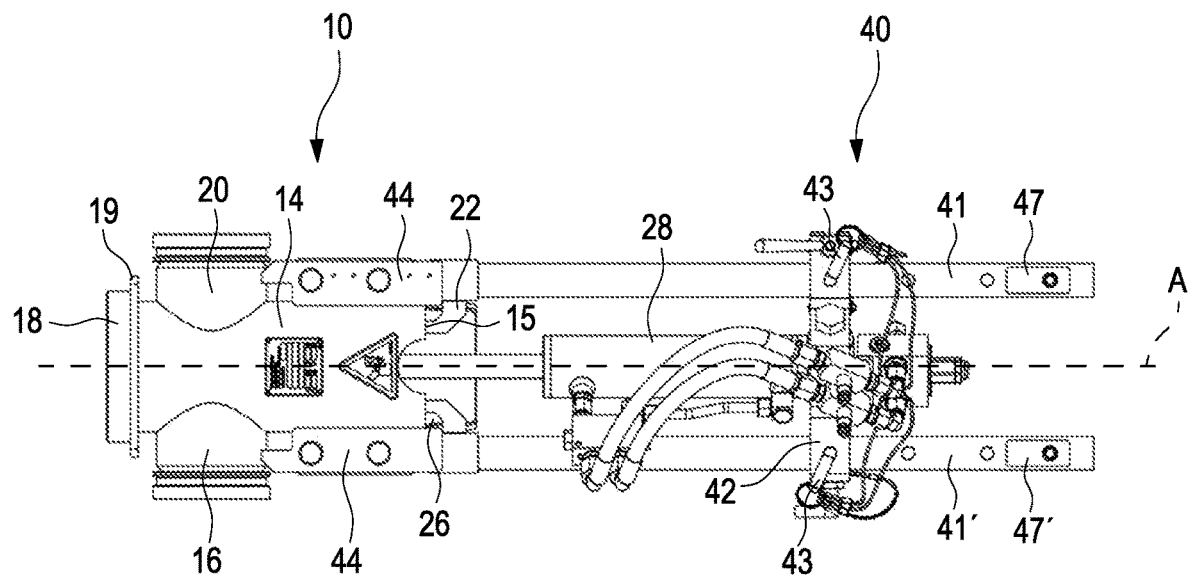
FIG. 1 shows a plan view of a control fitting according to the invention in the open position.

FIG. 1 shows a control fitting 10, which has a two-way cross fitting on one side and a guidance device 40 on another side. The two-way cross fitting 10 comprises an inlet port 16, an outlet port 18 and a through-port 20 arranged as an extension of the inlet port 16. The control fitting 10 furthermore has a guide piece 14 with a control member 22 arranged in the guide piece 14, wherein the control member 22 can be moved between an open position, a closed position and a cleaning position. In the embodiment shown, the guide piece 14 is designed as a single piece with the two-way cross fitting; however, it is also possible to design the two-way cross fitting to be detachable from the guide piece 14.

The control fitting 10 can be connected by means of its inlet port 16 and its through-port 20 (e.g. via a pipe coupling) to a delivery line/delivery pipe (not illustrated), which is laid, for example, on an outer side of formwork bounded by a formwork wall. On the inlet side, the delivery line is connected to the pressure side of a liquid concrete pump. The outlet port 18 can be used to connect the control fitting 10 to the formwork (not shown) via an opening in the formwork wall. For this purpose, the outlet port has a connection plate 19. Depending on the setting of the control member 22, liquid concrete can be conveyed via the control fitting 10 into the formwork and/or in the direction of the delivery line.

In the illustration in FIG. 1, the control member 22 is in an open position, in which the outlet port 18 communicates with the inlet port 16 and the throughport 20 communicates with the inlet port 16. By an axial movement of the control member 22 in the direction of the outlet port 18, the control member 22 can be transferred into a closed position (not shown). In the closed position, the outlet port 18 is shut off from the inlet port 16 and the through-port 20 communicates with the inlet port 16. The guide piece 14 has an opening 15 at an end facing away from the outlet port, with the result that, in the open position, the control member projects partially out of the guide piece 14.

The control member 22 is designed as a piston with a substantially cylindrical shape and is arranged in alignment with the outlet port 18. By means of a movement in the axial direction, the piston can be transferred between a releasing open position (FIG. 1), in which the outlet port 18 is open to the inlet port 16, and a shut off closed position (not shown), in which the outlet port 18 is shut off from the inlet port 16. The through-port 20 is connected to the inlet port 16 both in the open position and in the closed position of the control member 22. In the closed position, the piston penetrates sealingly into the outlet port 18 and closes the latter, while a connection between the inlet port 16 and the through-port 20 acts as a "bypass" line. In the open position, the piston is retracted from the guide piece 14 in such a way that it opens a connection between the inlet port 16, the outlet port 18 and the through-port 20.

The piston has an aperture 26 directed transversely to its movement direction A (dashed line in FIG. 1). In the closed position of the piston, the aperture 26 opens up a passage from the inlet port 16 to the through-port 20. The piston is designed with an aperture 26 that is aligned with the through-port 20 in the closed position. The piston can be actuated by means of a controlled hydraulic cylinder 28 or pneumatic cylinder. On a side facing away from the outlet port, the guide piece 14 has an opening 15, through which the piston can be moved. The piston can be moved partially or completely through the opening 15.

The piston can be produced from polyurethane. A piston made of polyurethane has the advantage that the piston can be removed more easily from the guide piece 14 after the hardening process of the liquid concrete. In one possible embodiment, the piston has a steel frame in order to dissipate forces which occur. This steel frame is encapsulated in polyurethane, resulting in a piston of substantially cylindrical shape with a lateral surface made of polyurethane. The abrasion-resistant polyurethane serves to enable the piston to be released from the guide piece 14 again after the hardening process.

Figure 4:
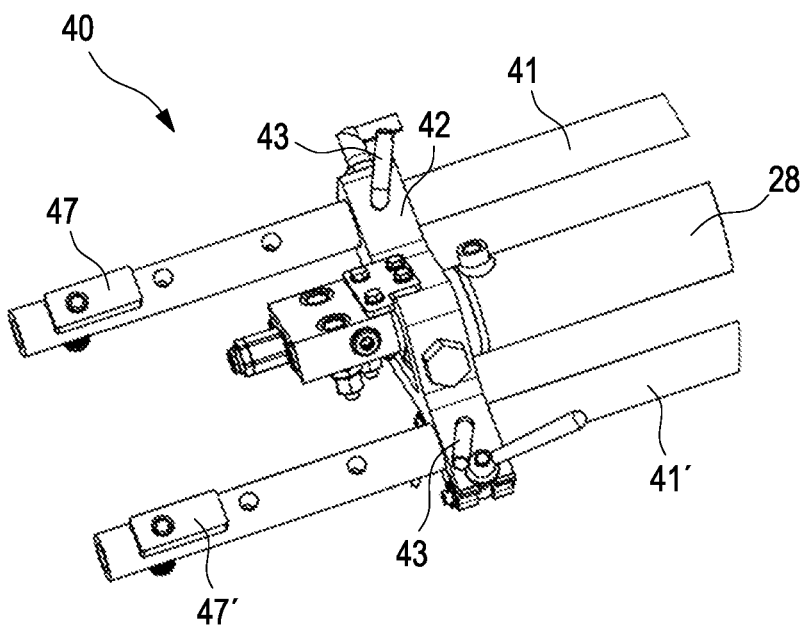
FIG. 4 shows an enlarged three-dimensional view of a guidance device of the control fitting of FIG. 1.

For actuation of the control member 22, the control fitting 10 additionally has the guidance device 40 (cf. also FIG. 4). By means of the guidance device 40, the control member 22 can be transferred between the closed position and the open position, for example. For this purpose, the guidance device 40 has two guide rods 41, 41' arranged outside the guide piece 14. The guide rods 41, 41' run both parallel to one another and parallel to the movement axis A. A yoke 42, which is provided for holding means for producing the translational movement of the control member 22, is mounted in a movable manner on the guide rods 41, 41'. In the embodiment illustrated, the translational movement can be produced, for example, by means of a hydraulic cylinder 28 or pneumatic cylinder. The guide rods 41, 41' can have holes or other means for locking 43 the yoke 42 at predetermined points. A stop 47, 47' for the yoke 42 is provided at each end of the guide rods 41, 41'.

FIG. 1 shows the guidance device 40 in an operating position. In the operating position, the yoke 42 is mounted in a position on the guide rods 41, 41' which is comparatively close to the guide piece 14. In the operating position, movement of the control member 22 between the open position and the closed position is allowed.

For the control fittings 10 in FIGS. 2 to 14, essentially what has been described with reference to the example in FIG. 1 applies, and therefore only differences will be discussed below.

Figure 2:
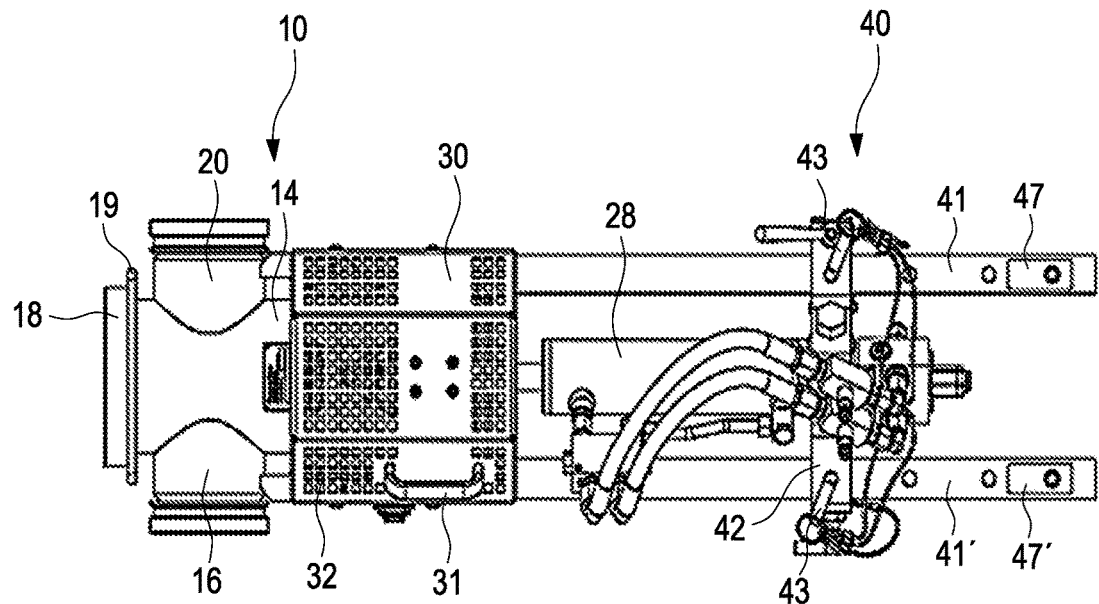
FIG. 2 shows the control fitting of FIG. 1 with a safety cover.

The control fitting 10 shown in FIG. 2 is in the open position and additionally has an openable safety cover 30. During concreting, the cover 30 is closed. During cleaning, the cover 30 can be open. For easy handling when opening the safety cover 30, it can have a handle 31. In order to reduce the total weight and for better ventilation, the safety cover 30 can additionally have ventilation slots 32. The safety cover 30 can be of two-part design, wherein an upper part is designed to be movable. The safety cover 30 can be attached by means of one or more guide holders 44 mounted on the guide piece 14 and can additionally have a locking element in order to prevent unwanted release of the safety cover. In the open position, a section of the control member 22 which projects out of the guide piece 14 is covered by the safety cover 30. The safety cover 30 is thus configured in such a way that it covers all the movable parts (in particular the control member) in the operating position, thereby minimizing the risk of injury.

Figure 3:
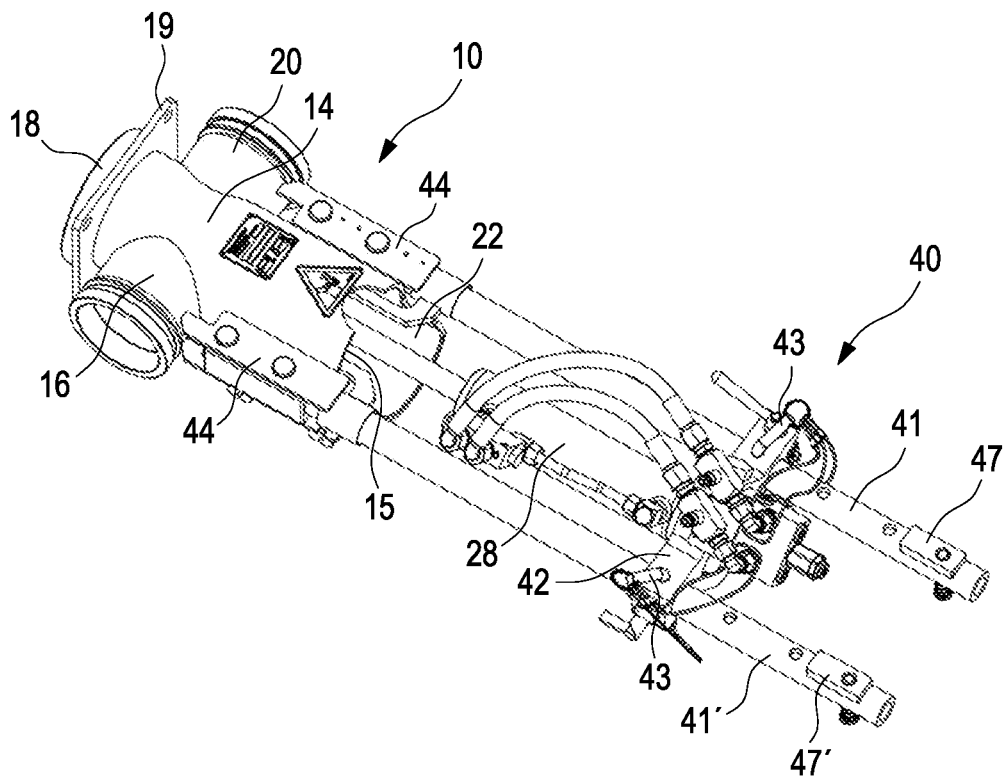
FIG. 3 shows a three-dimensional view of the control fitting of FIG. 1.

FIG. 3 shows the control fitting 10 of FIG. 1 in a perspective illustration. In this view, the opening 15 at the end of the guide piece 14 is clearly visible. A part of the control member 22, which can be moved through the opening 15, projects through the opening 15. FIG. 4 shows the guidance device 40 of FIG. 1 in the operating position in an enlarged illustration.

Figure 5:
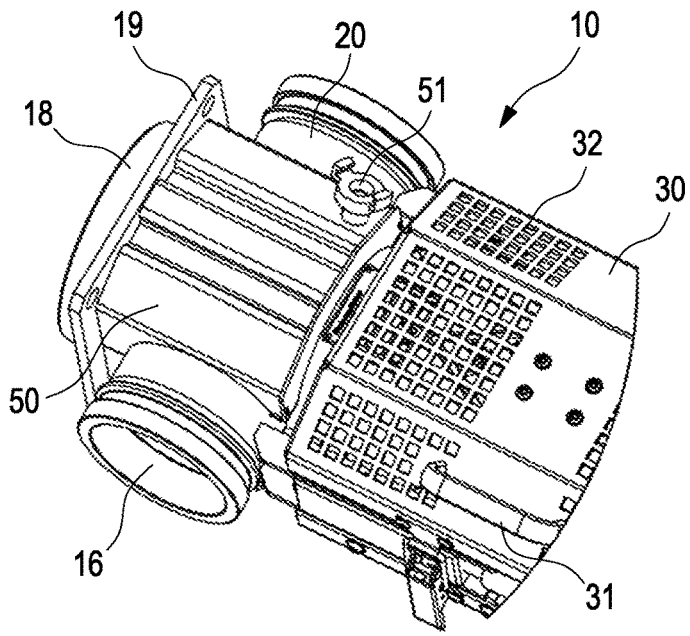
FIG. 5 shows an enlarged view of the two-way fitting of FIG. 2 with the safety cover and an additional cooling element.

FIG. 5 shows the two-way cross fitting with an additional cooling element 50. In this embodiment, the cooling element 50 is designed to be removable and has an inlet or outlet (cf. reference numeral 51) for a cooling medium. The connection plate 19 of the outlet port 18 can be designed specifically for receiving (or retrofitting) the cooling element 50. Depending on the environmental conditions, this measure can bring about a reduction in the temperature of the control fitting 10 or of the concrete slurry between the control member and the guide piece.

Figure 6:
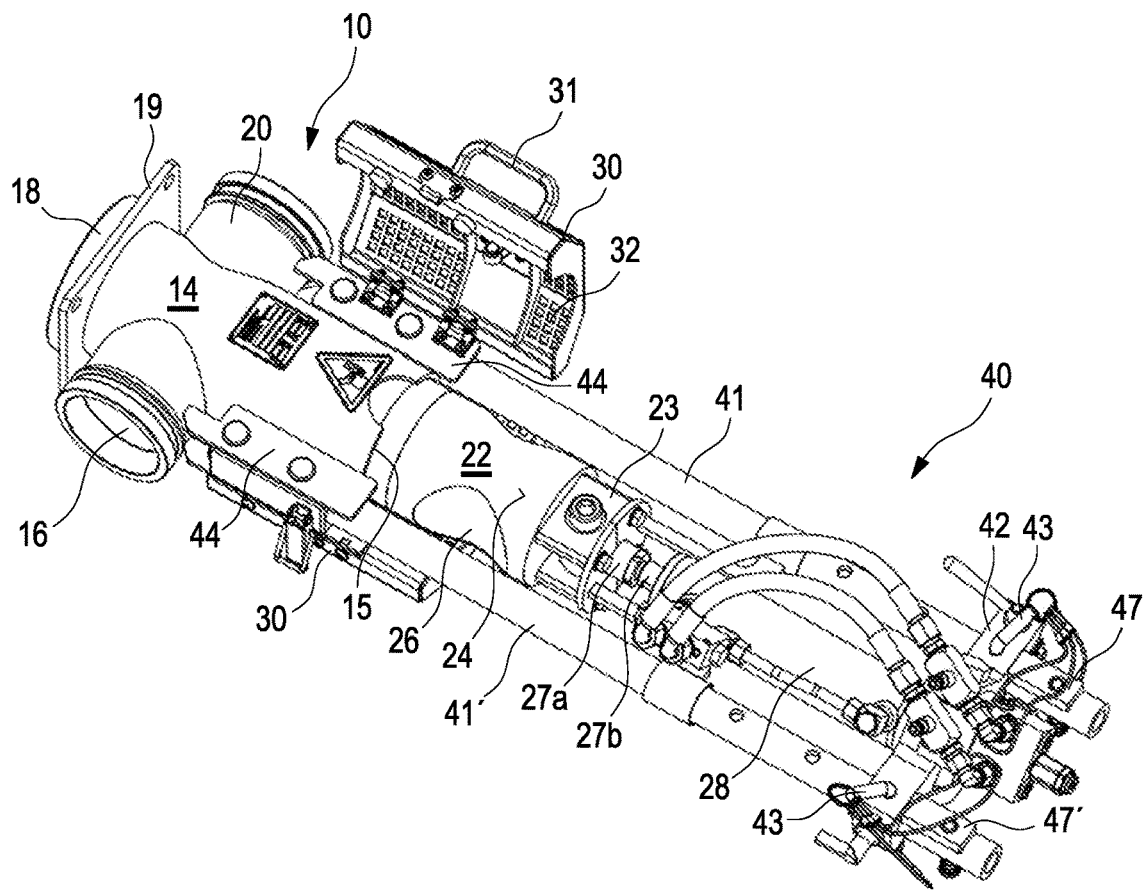
FIG. 6 shows a three-dimensional view of a control fitting according to the invention, in which the control member has been retracted almost completely from the guide piece.
Figure 7:
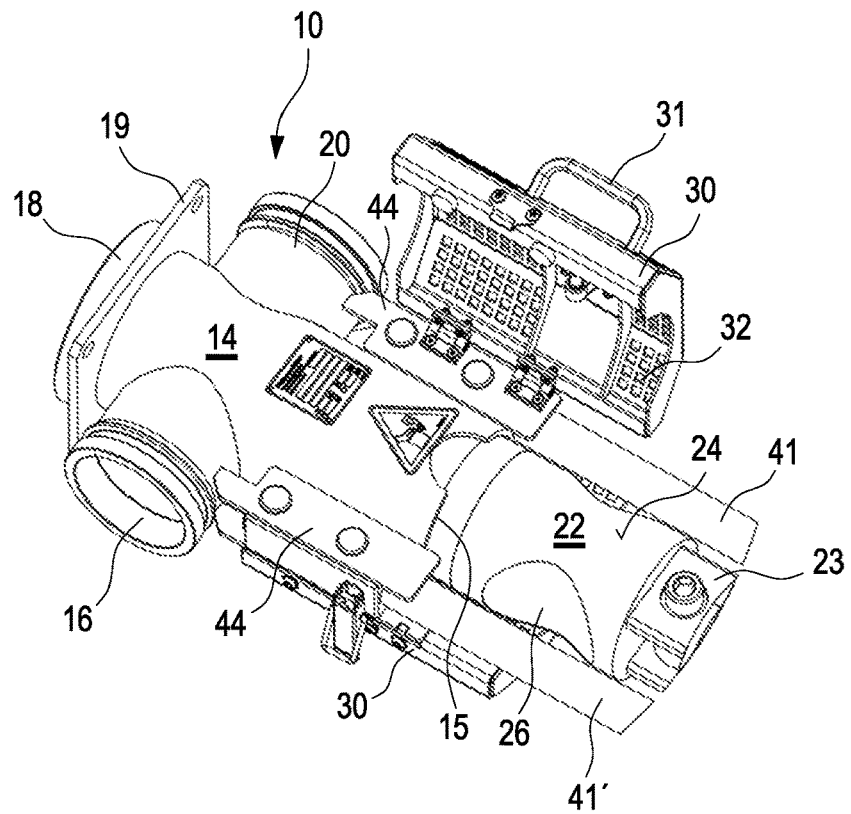
FIG. 7 shows an enlarged view of the two-way cross fitting of the control fitting of FIG. 6.
Figure 8:
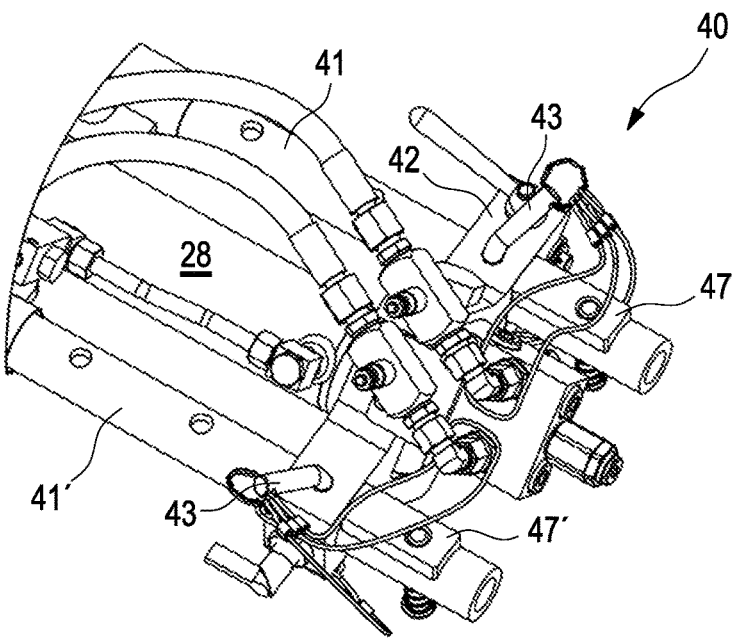
FIG. 8 shows an enlarged view of the guidance device of the control fitting of FIG. 6.

FIGS. 6 to 8 show a control fitting 10 with the safety cover 30 swung open. The guidance device 40 is no longer in the operating position but in a cleaning position. In the cleaning position, movement of the control member 22 into the open and/or closed position is prevented. In the cleaning position, the yoke 42 is mounted on the guide rods 41, 41' in a position close to the stops 47, 47' (see also FIG. 8). In addition, the control member 22 has been almost completely retracted from the guide piece 14 (see also FIG. 7). In comparison with the operating position, the control member 22 has been moved along the movement axis A through the opening 15 of the guide piece 14. In this position, the aperture 26 is arranged completely outside the guide piece 14 and can be cleaned manually. In this embodiment, the control member 22 has a steel frame 23 and a lateral surface 24 made of polyurethane. In addition, a rounded end face of the control member 22 can be seen which penetrates sealingly into the outlet port 18 in the closed position and closes the latter. The end face additionally serves as a crushing edge for stones during the closing process.

In the position of the control member 22 shown in FIG. 6, an articulation eye 27a, which is arranged below the steel frame 23 and is connected to the cylinder rod 27b of the hydraulic cylinder 28 by means of a screw connection, is visible. By means of the screw connection instead of a fixed connection between the articulation eye 27a and the cylinder rod 27b, fine adjustment of the control member 22 can be performed. Formwork walls with different formwork skin thicknesses can, for example, make it necessary to adapt the position of the control member 22 in the closed position.

Figure 9:
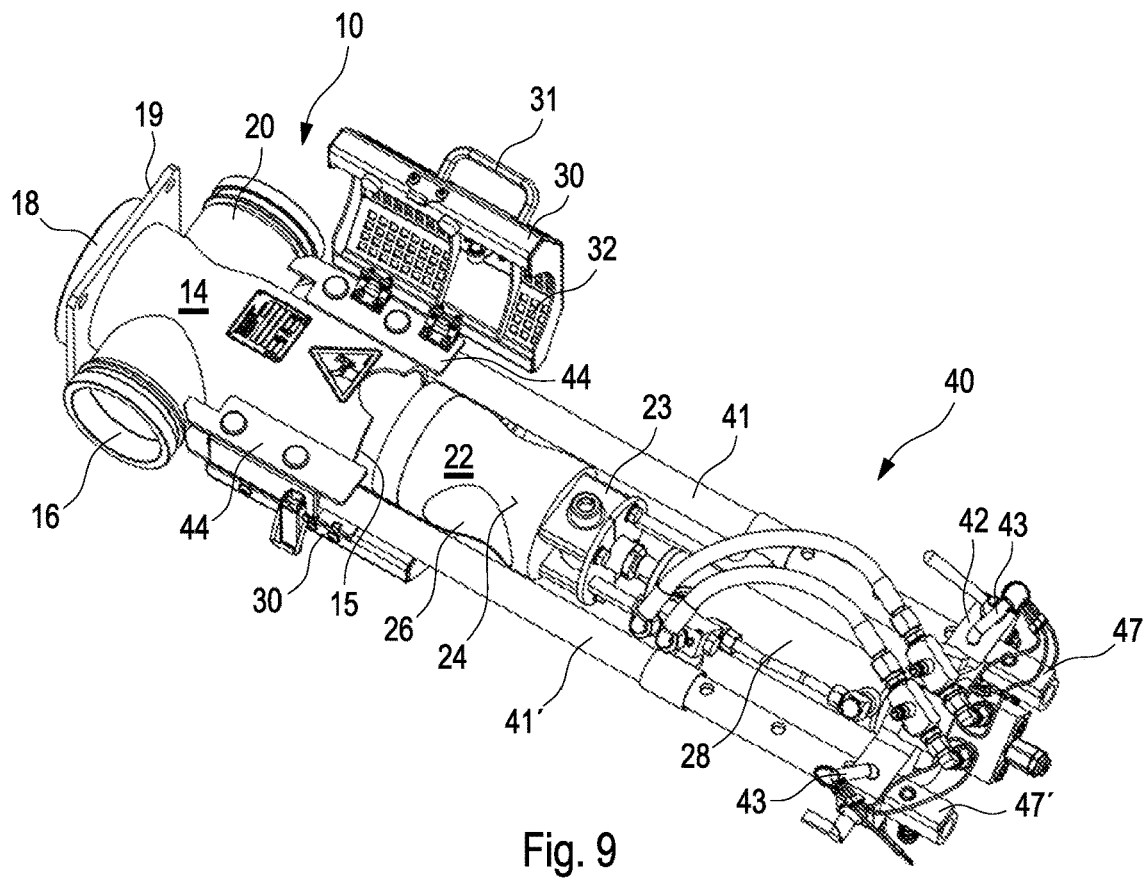
FIG. 9 shows a three-dimensional view of a control fitting according to the invention in a first cleaning position.
Figure 10:
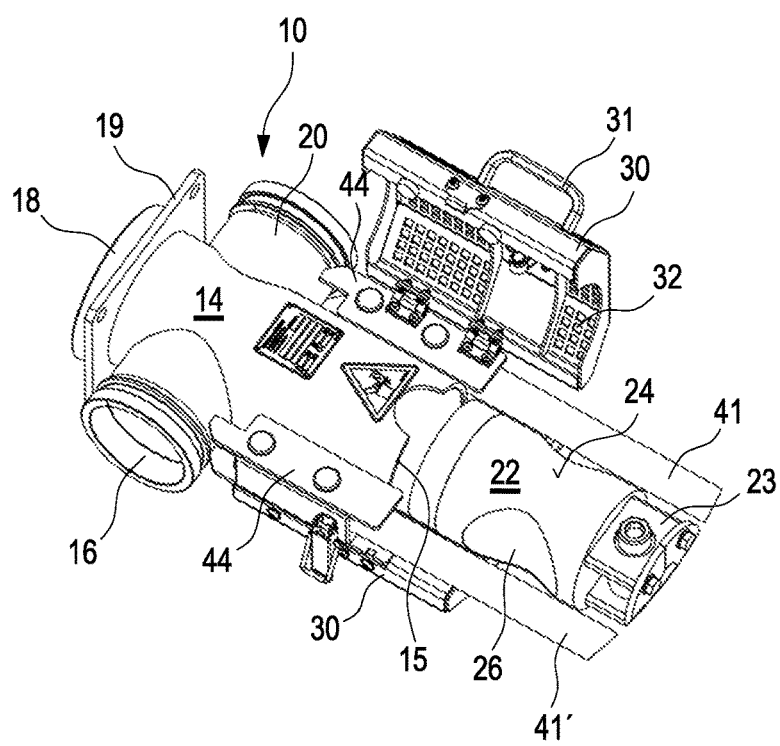
FIG. 10 shows an enlarged view of the two-way cross fitting of the control fitting of FIG. 9.
Figure 11:
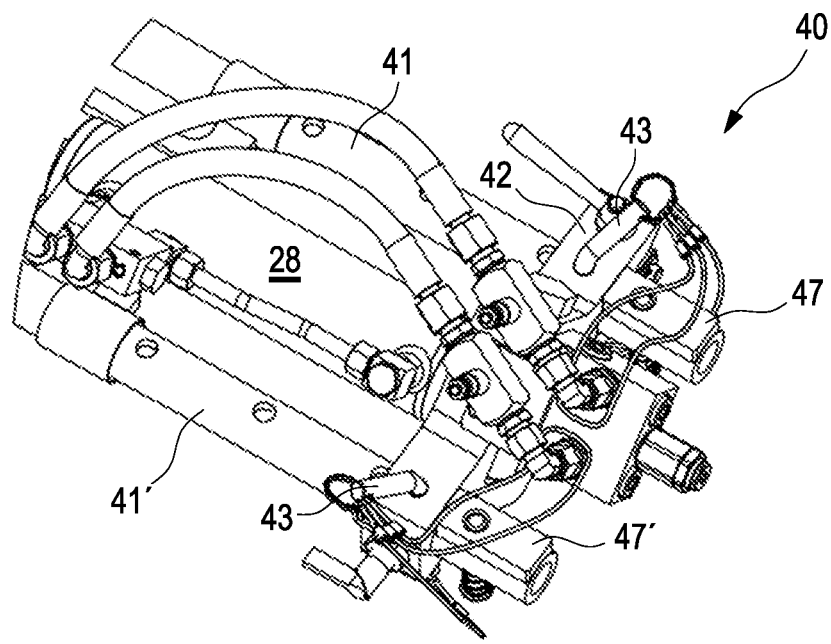
FIG. 11 shows an enlarged view of the guidance device of the control fitting of FIG. 9.

FIGS. 9 to 11 show a control fitting 10 with the safety cover 30 open in a first cleaning position. In the first cleaning position, the guidance device 40 is likewise in the cleaning position. In the first cleaning position, the control member 22 is arranged completely outside the guide piece 14. The control member 22 can thus be cleaned completely and from all sides. In the illustrated embodiment, the control member 22 is guided exclusively by means of the guidance device 40 and no longer by means of the guide piece 14.

Additional guide elements (not illustrated) can be used, which are arranged on an outer side of the guide piece 14 and project beyond the end of the guide piece 14 (in principle similar to the guide holders 44). For example, at least two such additional guide elements are used. The guide elements offer an additional guide for the control member 22 outside the guide piece 14 and thus minimize the risk that the control member 22 will accidentally tilt out of the guide. During cleaning, the guide elements can be retracted or swung in manually.

Figure 12:
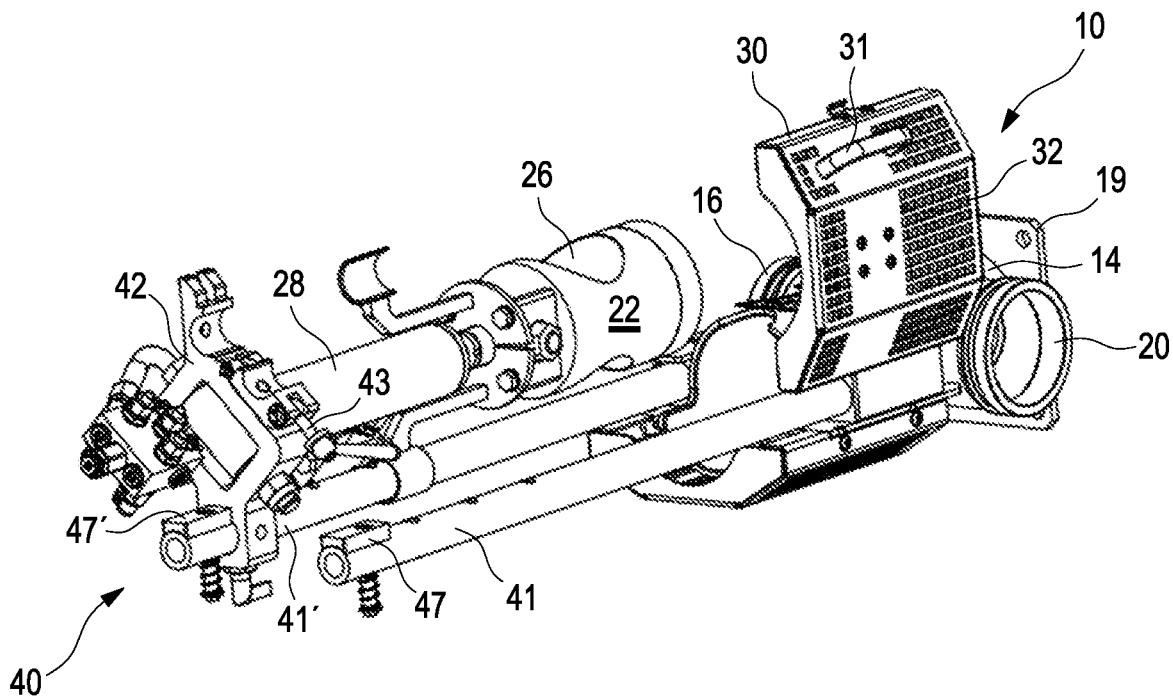
FIG. 12 shows a three-dimensional view of a control fitting according to the invention in a second cleaning position.
Figure 13:
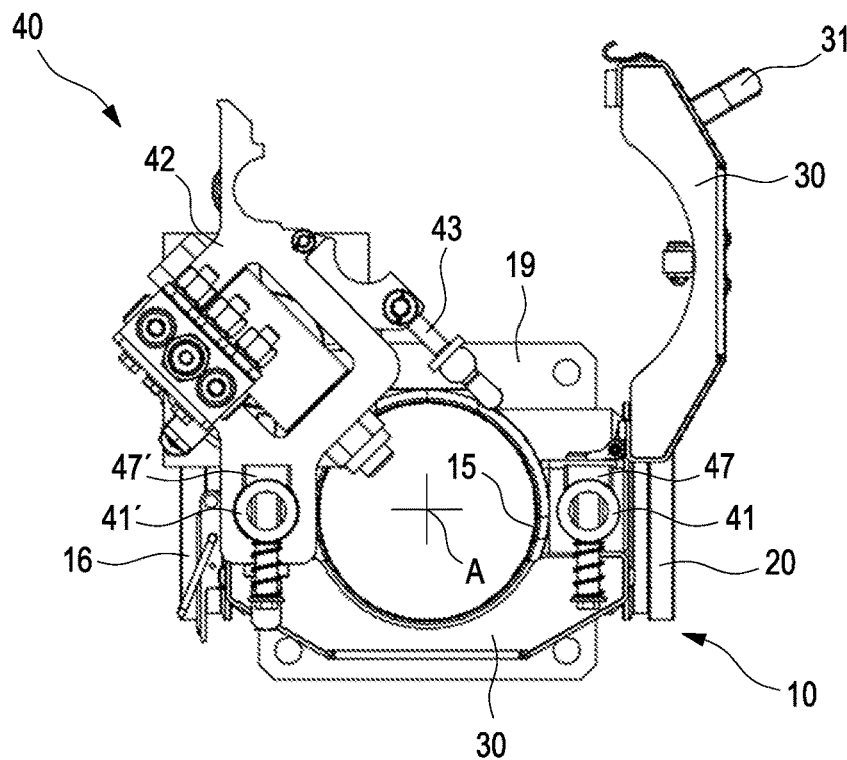
FIG. 13 shows a plan view along the movement axis of the control fitting of FIG. 12.

FIGS. 12 and 13 show the control fitting 10 in a second cleaning position. The second cleaning position is outside the movement axis A predetermined by the guide piece 14 (cf. FIG. 13). The guidance device 40 is in the cleaning position. Pivoting of the control member 22 out of the movement axis A can take place since the yoke 42 on a first guide rod 41 is released and rotated through 90° about a second guide rod 41'. The yoke 42 together with the control member 22 and the hydraulic cylinder 28 thus perform a pivoting movement about the second guide rod 41'.

Figure 14:
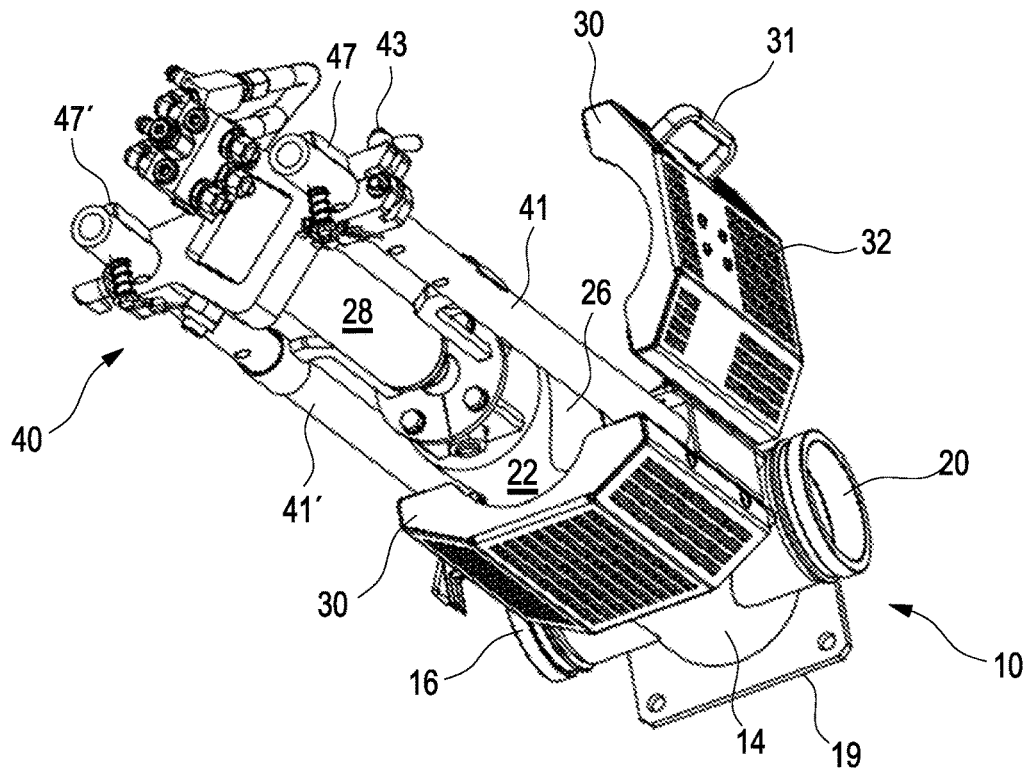
FIG. 14 shows a three-dimensional view of a further control fitting according to the invention in another position.

The hinged mechanism described enables the control fitting 10 to be transferred between the first and second cleaning positions. In the second cleaning position, the control member 22 is supported on the guide rod 41, making the guide piece easily accessible. This position affords easy access for cleaning both the control member 22 and the guide piece 14. Owing to the open design of the guide piece 14 by virtue of the opening 15, the control member 22 can be moved into the first and/or second cleaning position after each concreting operation and then cleaned manually in order to create a good starting situation for the next concreting operation. By means of regular cleaning, which is simplified according to the invention, the wear on the control fitting 10 is reduced. The control fitting 10 does not require laborious and time-consuming repositioning of pipes or hoses and their intermediate cleaning. As shown in FIG. 14, the hinged mechanism also enables the control fitting 10 to be returned to the first cleaning position.

In a method for cleaning the control fitting 10, the guidance device 40 is first changed over in such a way from the operating position into the cleaning position, by releasing and moving the yoke 42, that the control member is retracted completely from the guide piece 14. The yoke 42 is then secured in the cleaning position and after this the yoke 42 is released from one of the guide rods 41'. The yoke 42 can then be pivoted about the corresponding other guide rod 41 in such a way that the control member 22 is pivoted out of the movement axis A predetermined by the guide piece 14, thereby making the guide piece 14 accessible. Finally, the control member 22 and the guide piece 14 can be cleaned by means of a cleaning medium.

Figure 15:
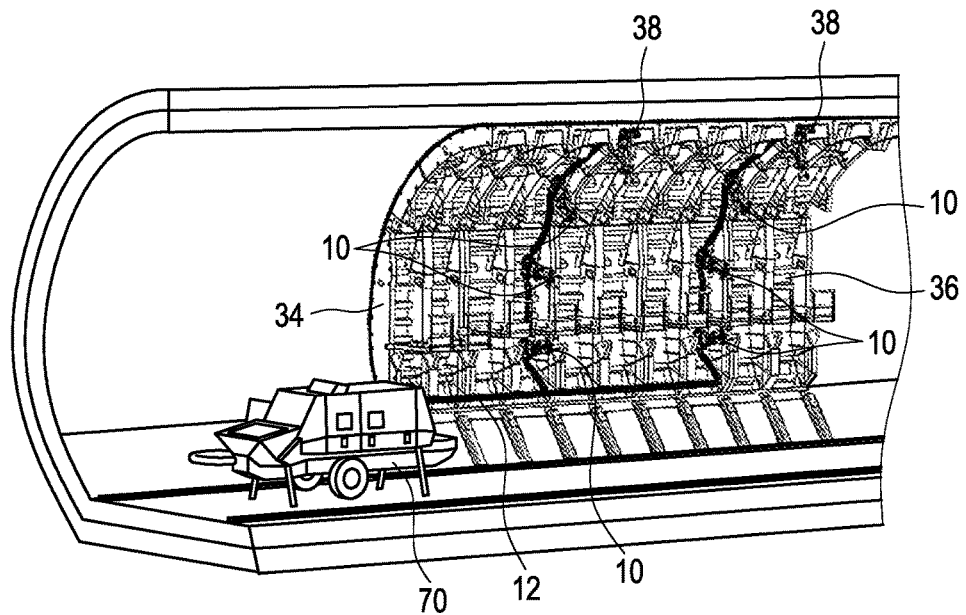
FIG. 15 shows a schematic illustration of an arrangement according to the invention for producing concrete components using liquid concrete together with formwork in a tunnel.

FIG. 15 shows an arrangement for producing concrete components using liquid concrete in a tunnel. Arranged along a tunnel wall is formwork 36, which is bounded by at least one formwork wall 34, which is aligned substantially vertically, at least in some section or sections. A plurality of control fittings 10 is connected by their outlet ports 18 to defined openings in the formwork wall 34. On the outside of the formwork wall 34 runs a delivery line 12, which is connected to the inlet ports 16 and through-ports 20 of the control fittings 10. On the inlet side, the delivery line 12 is connected to the pressure side of a liquid concrete pump 70. The liquid concrete arriving under a delivery pressure can be introduced into the formwork 36 via the outlet port 18 when the control member 22 of the respective control fitting 10 is open. Since the inlet port also communicates with the throughport, liquid concrete also passes via the through-port 20 into the downstream delivery line 12 to an adjacent control fitting 10 during the introduction process. In the closed state of the control member 22, the outlet port is closed with respect to the passage of thick material, and therefore the incoming liquid concrete is conveyed through the aperture 26 only into the downstream delivery line 12 to a further introduction point. As filling progresses, the control fittings 10 are closed in succession, beginning at the control fitting arranged closest to the liquid concrete pump 70.

In the illustrated embodiment, the delivery line 12 has two vertical runs, each having a plurality of control fittings 10. The number of control fittings for uniform filling depends, inter alia, on the dimensioning of the formwork 36, the permissible drop height and the flow properties of the liquid concrete. In comparison with the illustrated embodiment, therefore, it is also possible to use more or fewer control fittings 10 or to use more or fewer vertical runs. The vertical runs can be controlled individually or jointly by means of a pipe switch (not illustrated). In principle, however, the concrete flow can also be controlled manually in each individual vertical run. A cleaning port 38 is arranged at an end of a vertical run remote from the concrete pump.

Compared to horizontal runs, the use of vertical runs leads to less residual concrete remaining in the overall system which has to be removed during subsequent cleaning. The risk of blockages in the delivery line 12 is reduced since the delivery line 12 is shorter and has fewer bends in comparison with (meandering) horizontal runs. Moreover, the vertical runs can be controlled individually. If, for example, short blocks are to be concreted, it is possible, for example, for just the front or rear vertical run to be used, the remaining runs then remaining completely free of concrete.

At the end of a filling operation, all the control members 22 of the control fittings 10 are brought into their closed position and the entire system can be cleaned in one step without disassembly via the cleaning port 38, e.g. using a cleaning medium under pressure. Rapid cleaning with compressed air saves operating personnel and reduces the risk of injury since it is not necessary to open the entire system during concreting and cleaning. Via the cleaning ports 38, it is also possible, if appropriate, for plug-like or sponge-like cleaning bodies to be introduced ("shot through") in order to clean the delivery line 12.

Figure 16:
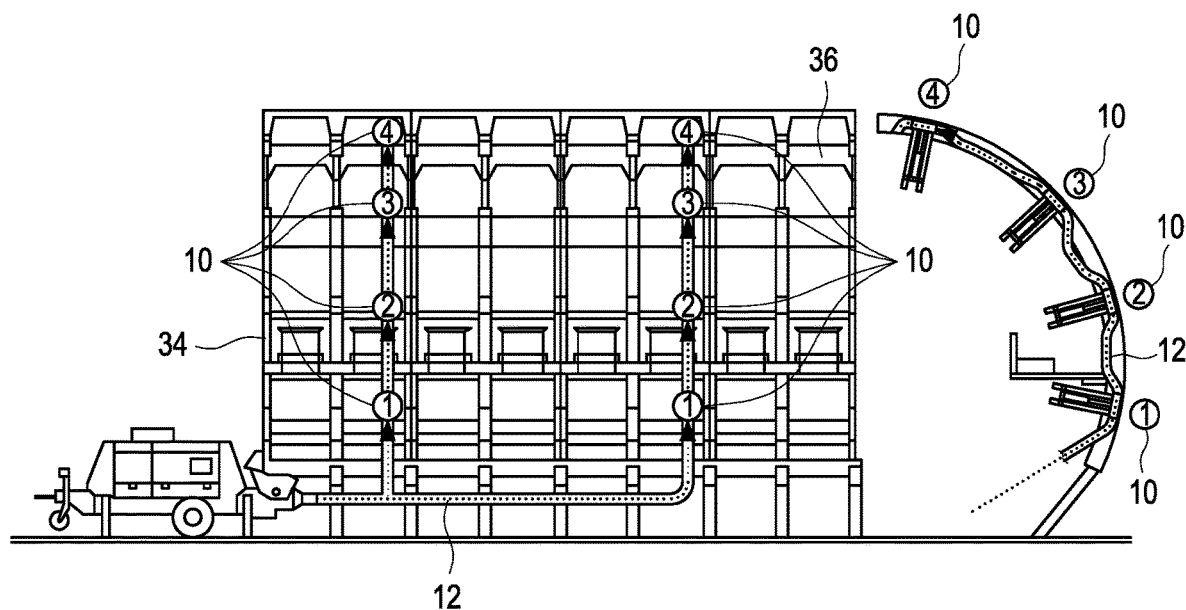
FIG. 16 shows a schematic illustration of a method according to the invention for producing a concrete component.

A method for producing a concrete component with the aid of the above-described arrangement will be illustrated with reference to FIG. 16. FIG. 16 shows the arrangement once from the front and once from the side. The control fittings 10 of the arrangement for producing concrete components are in the open position. The delivery line 12 is supplied with liquid concrete (concrete flow in the direction of the arrow in FIG. 16). The formwork cavity behind the formwork wall 34 is filled in the open position (position (1) in FIG. 16) via a control fitting 10 which is first in the vertical run in the vertical delivery direction. The control member 22 of the first control fitting 10 (position (1) in FIG. 16) is moved into the closed position as soon as the concrete in the formwork cavity has reached the level of the first control fitting 10 (position (1) in FIG. 16). The filling of the formwork cavity behind the formwork wall 34 is continued via a control fitting 10 which is next in the vertical run in the vertical delivery direction (position (2) in FIG. 16), in the open position. After the successive repetition of the filling and movement of the control member 22 into the closed position for all the control fittings (positions (2), (3) and (4) in FIG. 16), the process is complete. In the case of two or more vertical runs, a pipe switch (not illustrated) is provided, which supplies the vertical runs alternately with liquid concrete.

As an alternative to manual control, in which an operator hydraulically closes the control fitting 10 by means of radio remote control, automatic control of the control fittings 10 is also possible. In this case, the filling level of the concrete in the formwork cavity is determined by means of at least one filling level sensor 11 (shown in FIG. 17) integrated into the formwork wall 34, and as soon as the concrete has reached the level of the control fitting 10, the control fitting 10 is automatically closed. The concrete pump is preferably switched off or throttled during the closing process of the control fitting 10, and this can likewise be performed automatically as soon as the filling level sensor 11 registers that the concrete has reached the level of the control fitting 10.

Figure 17:
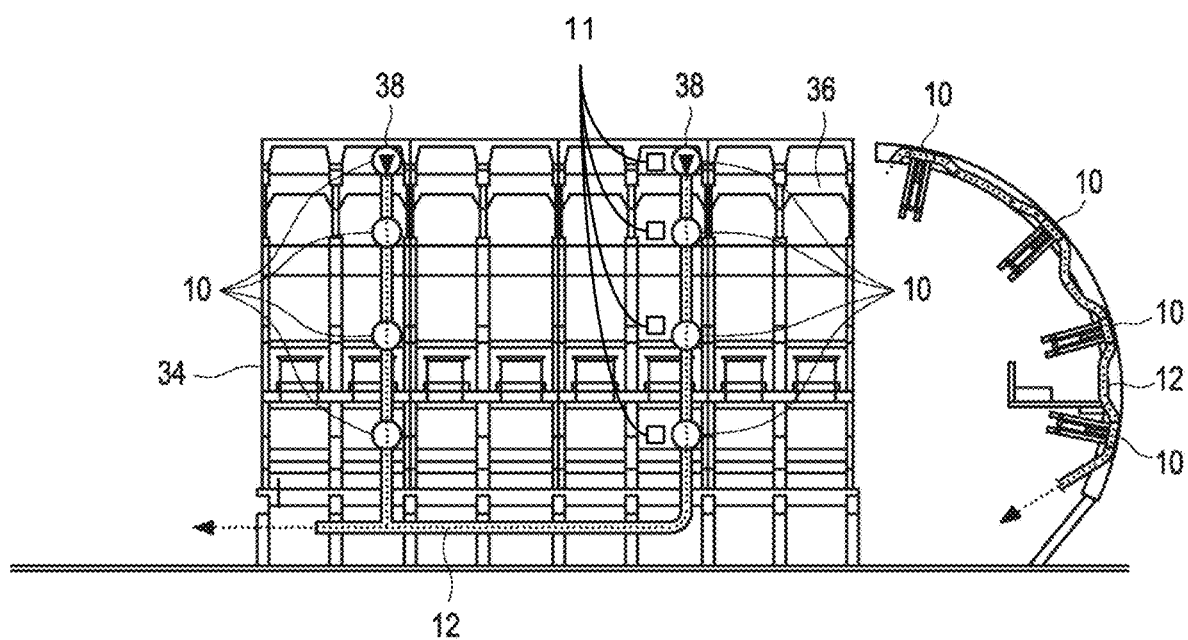
FIG. 17 shows a schematic illustration of a method according to the invention for cleaning an arrangement according to the invention for producing concrete components.

FIG. 17 illustrates a method for cleaning an arrangement for producing concrete components using liquid concrete after a completed concrete filling operation (according to FIG. 16) with the control fittings 10 in the closed position. The arrangement corresponds to the arrangement shown in FIG. 16, the cleaning process taking place in the opposite direction in comparison to the concrete filling process (cleaning flow in the direction of the arrow in FIG. 17). In the cleaning method, a sponge ball is shot through the vertical run at a vertical upper end of each vertical run. This sponge ball can be introduced into the overall system by means of the preloaded cleaning port 38 provided at the vertical upper end of the vertical run.

If the control members 22 of the control fittings 10 are in an open position projecting partially out of the guide piece 14, they can be cleaned by means of a cleaning medium, which is, for example, under pressure. The control member 22 is then brought into a first cleaning position fully retracted from the guide piece (as shown in FIGS. 9-11) and is cleaned. In order to achieve improved cleaning performance, before cleaning, the control member 22 is brought out of the first cleaning position into a second cleaning position, which is outside a movement axis predetermined by the guide piece 14. This allows additional cleaning of the guide piece 14.

The invention claimed is:

1. A control fitting having
a two-way cross fitting, which has an inlet port, an outlet port and a throughport, and having
a control member, which is arranged in a guide piece of the control fitting so as to be movable between an open position and a closed position, and
an openable safety cover which covers a section of the control member that projects out of the guide piece in the open position,
wherein, in the open position of the control member, the outlet port communicates with the inlet port and, in the closed position of the control member, the outlet port is shut off from the inlet port, and the through-port communicates with the inlet port both in the open position and in the closed position of the control member,
wherein the guide piece has, on an end remote from the outlet port, an opening for receiving the control member, and
wherein the guide piece and the control member allow the control member to be guided completely out of the guide piece through the opening.

2. The control fitting of claim 1, wherein the control member projects at least partially out of the guide piece, at least in the open position.

3. The control fitting of claim 1, wherein the two-way cross fitting is detachable from the guide piece, or in which the two-way cross fitting is a single piece with the guide piece.

4. The control fitting of claim 1, wherein the control member is a piston with an aperture that is aligned with the through-port when the control member is in the closed position.

5. The control fitting of claim 4, wherein the piston is made at least partially of polyurethane or has a lateral surface formed substantially from polyurethane.

6. The control fitting of claim 1, comprising a cooling element in a region of the guide piece.

7. An arrangement for producing concrete components using liquid concrete, comprising a formwork or shuttering, which is bounded by at least one formwork wall aligned substantially vertically, at least in some section or sections, and further comprising a device for introducing liquid concrete into the formwork, the device comprising a liquid concrete pump, wherein a delivery line, which is connected to the liquid concrete pump at an inlet end and has at least one vertical run, is arranged on an outer side of the formwork wall, wherein a plurality of control fittings having a two-way cross fitting of claim 1, is arranged in the vertical run for the successive filling of a formwork cavity behind the formwork wall.

8. The arrangement of claim 7, comprising at least one further vertical run which is connected to the delivery line by means of a pipe switch.

9. The arrangement of claim 7, wherein a cleaning port is provided at a vertical upper end of the at least one vertical run, the cleaning port serving to shoot a sponge ball into the vertical run.

10. A method for producing a concrete component, comprising the following steps:
providing an arrangement for producing concrete components using liquid concrete of claim 7 with the control fittings in the open position,
supplying the delivery line with liquid concrete, filling the formwork cavity behind the formwork wall via a control fitting in the open position which is first in the vertical run in the vertical delivery direction,
moving the control member of the first control fitting into the closed position as soon as the concrete in the formwork cavity has reached the level of the first control fitting,
continuing the filling of the formwork cavity behind the formwork wall via a control fitting in the open position which is next in the vertical run in the vertical delivery direction,
successively repeating the steps of filling and moving into the closed position of the control member for all the control fittings.

11. The method of claim 10, wherein, in the case of two or more vertical runs, a pipe switch is provided which supplies the vertical runs alternately with liquid concrete.

12. The method of claim 10, wherein the level of the liquid concrete is determined by means of a sensor arranged on the formwork wall, and as soon as the concrete has reached the level of the first control fitting, the first control fitting closes automatically as soon as the concrete has reached the level of the next control fitting, the next control fitting closes automatically.

13. A method for cleaning an arrangement for producing concrete components using liquid concrete of claim 7 after a completed concrete filling operation with the control fittings in the closed position, wherein, at a vertical upper end of each vertical run, a sponge ball is shot through the respective vertical run by means of a preloaded cleaning port provided at the vertical upper end of the at least one vertical run.

14. A control fitting comprising:
a two-way cross fitting, which has an inlet port, an outlet port and a throughport, and having
a control member, which is arranged in a guide piece of the control fitting so as to be movable between an open position and a closed position, and
wherein, in the open position of the control member, the outlet port communicates with the inlet port and, in the closed position of the control member the outlet port is shut off from the inlet port, and the through-port communicates with the inlet port both in the open position and in the closed position of the control member,
wherein the guide piece has, on an end remote from the outlet port, an opening for receiving the control member, the guide piece and the control member allow the control member-to be guided completely out of the guide piece through the opening, and
wherein the control member is moveable to a first cleaning position fully retracted from the guide piece.

15. The control fitting of claim 14, wherein the control member is movable from the first cleaning position into a second cleaning position outside a movement axis (A) defined by the guide piece.

16. The control fitting of claim 14, wherein a guidance device, which is arranged outside the guide piece, is provided for guiding the control member outside the guide piece.

17. The control of claim 16, wherein the guidance device is adjustable between an operating position and a cleaning position, wherein the operating position allows movement of the control member between the open position and the closed position, or, in the cleaning position, movement of the control member into the open or closed position is prevented.

18. The control fitting of claim 17, wherein, in the cleaning position, the guidance device allows the control member to be pivoted out of a movement axis (A) defined by the guide piece.

19. The control fitting of claim 16, wherein the guidance device comprises two guide rods which are arranged both parallel to one another and parallel to a movement axis (A) defined by the guide piece and on which a yoke for supporting translational movement of the control member is provided in a movable manner.

20. The control fitting of claim 19, wherein the yoke is moveable on the guide rods between the operating position and the cleaning position, or the yoke is detachable from a first of the guide rods to carry out a pivoting movement about a second of the guide rods.

21. A method for cleaning the control fitting of claim 20, comprising the following steps:
adjusting the guidance device from the operating position into the cleaning position by releasing and moving the yoke in such a way that the control member is retracted fully from the guide piece,
fixing the yoke in the cleaning position, releasing the yoke from one of the guide rods,
pivoting the yoke about the corresponding other guide rod in such a way that the control member is pivoted out of the movement axis (A) defined by the guide piece, thereby making the guide piece accessible,
cleaning the control member and the guide piece by means of a cleaning medium, which is preferably under pressure.

22. A method for cleaning a control fitting of claim 14, wherein the control member is cleaned by means of a cleaning medium, which is under pressure, in its open position in which it projects partially out of the guide piece.

23. The method of claim 22, wherein the control member is first brought into a first cleaning position fully retracted from the guide piece and is then cleaned.

24. The method of claim 23, wherein, before cleaning, the control member is brought out of the first cleaning position into a second cleaning position which is outside a movement axis (A) defined by the guide piece.

25. An arrangement for producing concrete components using liquid concrete, comprising a formwork or shuttering, which is bounded by at least one formwork wall aligned substantially vertically, at least in some section or sections, and further comprising a device for introducing liquid concrete into the formwork, the device comprising a liquid concrete pump, wherein a delivery line, which is connected to the liquid concrete pump at an inlet end and has at least one vertical run, is arranged on an outer side of the formwork wall, wherein a plurality of control fittings having a two-way cross fitting of claim 14, is arranged in the vertical run for the successive filling of a formwork cavity behind the formwork wall.

\* \* \* \* \*